INVENTOR
AUSTIN W. BARRY
BY ATTORNEY

United States Patent Office 3,424,969
Patented Jan. 28, 1969

3,424,969
BATTERY CHARGING CONTROL RESPONSIVE TO RATE OF RISE OF BATTERY VOLTAGE
Austin W. Barry, Fanwood, N.J., assignor to G-V Controls Inc., Livingston, N.J., a corporation of New Jersey
Filed July 22, 1966, Ser. No. 567,231
U.S. Cl. 320—21
Int. Cl. H02j 7/10
25 Claims

ABSTRACT OF THE DISCLOSURE

During the fast-charging of a battery the rate of rise of its voltage is sensed, and the fast-charging is terminated upon the sensing of a rate of rise of that voltage exceeding a predetermined rate.

---

This invention relates to battery charging control, and more particularly to improved means for and methods of such control. It is especially concerned with control of the fast-charging of a battery, by which is meant charging at a rate substantially greater than the minimum rate at which it would be possible to accomplish charging.

For the control of the charging of storage batteries of a variety of types various methods have been proposed. A common one is the termination of fast charge when a predetermined absolute battery voltage is reached; others comprise termination of fast charge when some phenomenon—such as a predetermined voltage on a third electrode, or a predetermined pressure generated by gassing—in one or more of the cells of the battery is detected. Reliance on absolute battery voltage entails series disadvantages; the absolute voltage of a battery at which it will actually be fully charged typically varies by a few tenths of a volt from battery to battery, while with any given battery a few tenths of a volt may be the difference between small and large charge—and on this consideration there are superimposed others, including some variation of the full-charge-representing voltage with temperature, the unavoidable tolerance inherent in absolute voltage-detecting means, and the like. On the other hand reliance on the detection of a phenomenon in one cell only risks serious under-or over charging of other cells, in view of the frequent inter-cell nonuniformities, while techniques of "averaging" of the detection as between each of several cells become cumbersome and inexact; furthermore the design of the battery itself is usually affected, unfavorably at least from the cost point of view, by provisions for detection of some phenomenon in an individual cell or cells.

I have observed that with many types of storage batteries—including for example nickel-cadmium, nickel-iron-and lead-acid—the completion of fast charge is attended by a substantial increase of the rate of rise of the overall battery voltage; more specifically, that during fast charge that battery voltage, after having risen rather abruptly during the first quite short interval of time, takes place with a relatively modest rate of rise until fast charge is substantially completed and finally rises at a rate which for a limited time progressively increases until it is substantially greater than the modest rate approximated by the rise occuring during the principal portion of the total time consumed in the fast charging. (It is during that final rise of increased rate that there sets in the gassing of the electrolyte which, if continued over a substantial interval, may seriously harm the battery.) I have found that it is readily possible to terminate the fast charging when that final increased rate of rise is observed, without regard to the absolute voltage of the battery and without resort to individual-cell observations of any character, and that when this is done there is achieved a highly satisfactory control of fast charging—with whose use batteries of various ages, and of considerable inter-cell differences of condition, may all be quite reliably brought to substantially the fullest state of charge of which they are respectively capable.

Accordingly in an important aspect my invention includes the method of control of the charging of a battery which comprises (1) sensing the rate of rise of voltage of the battery while fast-charging the battery, and (2) terminating that fast-charging upon a sensing of a rate of rise of that voltage exceeding a predetermined rate.

As brought out above, in the first quite short interval of time during the fast-charging of a battery the voltage rise will ordinarily be quite abrupt and thus of very high rate, and it is of course desirable to avoid the wholly permature termination of fast charge which would result from taking that initial rise into account. Accordingly my invention preferably contemplates that the sensing referred to in step (2) above set forth will be a sensing of a rate of rise of voltage of that battery exceeding a predetermined rate subsequent to a sensing of a rate of rise of voltage of that battery less than said predetermined rate.

Under certain circumstances such as the attempt to fast-charge on already-well-charged battery it is possible that the rate of rise less than the predetermined rate, referred to at the end of the immediately preceding paragraph, will not occur, and it then becomes desirable as a safety precaution to terminate the fast-charging otherwise than on the rate-of-rise basis. My invention accordingly preferably contemplates that in the absence of the sensing of a rate of battery-voltage rise less than said predetermined rate, but then only, the fast-charging will be terminated upon the attainment by the battery voltage of a predetermined ultimate magnitude.

While unexpressed limitations in this respect are not intended, I prefer in the carrying out of my invention that the termination of fast-charging will be effected by reducing the rate of charging from a fast-charge rate to a "topping" or trickle-charge rate, rather than by cutting off all charging current.

In another important aspect my invention comprises, in a battery charger which includes means providing for the fast-charging of a battery, the combination of means for sensing the rate of rise of voltage of the battery during the fast-charging thereof, and means connected with said sensing means for terminating said fast-charging in response to a sensing of a rate of rise of said voltage exceeding a predetermined rate. Preferably, for reasons brought out above, my invention in this aspect contemplates the preferred inclusion of means, operatively connected with said sensing means and with said terminating means, for suspending said response of said terminating means until after said sensing means has sensed one rate of rise of battery voltage less than said predetermined rate. Also for reasons brought out above, my invention in this aspect preferably further contemplates the inclusion of means, operatively connected with said terminating means and effective without regard to said suspending means, for causing the operation of said terminating means in response to the attainment by the battery voltage of a predetermined ultimate magnitude.

In my copending application Ser. No. 516,485, filed Dec. 27, 1965, I have disclosed and claimed a control system for battery charging (i) which will occasion no load on the battery in the event of interruption of power from the source of charging current and will thus avoid discharge of the battery during the period of the interruption yet will automatically reestablish charging at the appropriate rate at or briefly after the conclusion of the interruption, and (ii) with which charging of the battery at the appropriate rate will occur in response to mere connection of the battery to the charger terminals and mere disconnection of the battery will result in the assumption by the charger of a condition appropriate to such charging upon the next succeeding connection of a battery. The above-referred-to aspects of the present invention have been illustrated as embodied in a control system of that type, though no unexpressed limitation of those aspects are thereby intended—it being only in a more specific aspect that my present invention contemplates such a limitation.

Various objects of the invention have been made apparent in the foregoing brief description thereof. Allied and other objects will be apparent from the following detailed description and the appended claims.

In that detailed description reference is had to the accompanying drawings, in which.

Figure 1:
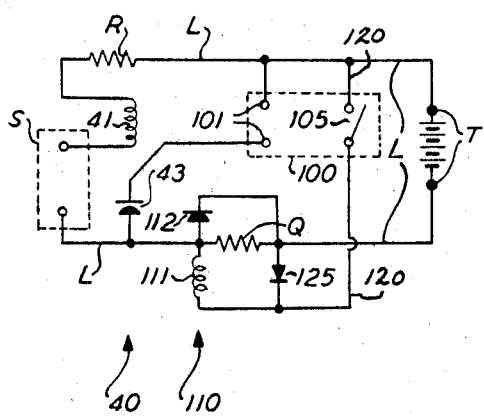
FIGURE 1 is simple schematic circuit diagram of a charger and control system therefor of the general type disclosed in my abovementioned copending application.

FIGURE 1 shows a battery charger elementarily comprising a pair of terminals T across which there may be connected a battery which is to be charged, a source S of charging current, a two-conductor line L through which charging current may flow from the source S to the battery, and a resistor R in series with the line L to establish the charging current, in the absence of substantial other resistance in the line, at a value appropriate for fast charge of the battery. In combination with the elements just referred to FIGURE 1 shows a simple control system of the basic type disclosed in my copending application above mentioned.

Thus in that figure there is shown charge-sensing relay 100 having an input circuit shown as a pair of terminals 101 connected with the line L and having a pair of normally open output contacts 105 operated (i.e., closed) in response to a state of completion of fast charge of a battery present across the terminals. There is further shown connected with the line L a charge-current-reducing switching device in the form of a pair of normally closed contacts 112, which shunt a current-reducing resistor Q serially present in the line. For the switching device 112 there is shown a control means in the form of a coil 111 which is energizable to render and to maintain that device operative (i.e., to open contacts 112 and to maintain them open); 111 and 112 may together form an electromagnetic relay 110. To energize the control means 111 and thereby to render the switching device 112 operative there is shown in FIGURE 1 a circuit 120, connected across the line L, in which that control means is serially included; that circuit is shown as also serially including the output contacts 105 of the charge-sensing relay 100, so that it is controlled by that charge-sensing relay. The control means 111, when the switching device 112 is operative (i.e., open) and the circuit 120 is not operative (i.e., is open at 105), is connected in effective series relationship with the line L, via diode 125, for energization by a component of the reduced charge current, thereby to maintain the switching device 112 operative. Means are provided to render the charge-sensing relay ineffective during the flow of reduced or no charge current in the line L; those means are shown as a current-sensing relay 40 having an input circuit or coil 41 connected in effective series relationship to that line and having a pair of normally open output contacts 43 operated (i.e., closed) in response to the flow of fast-charge current in that line—the connection of the charge-sensing relay's input circuit 101 with the line L being a connection across that line through the contacts 43.

Note is made that in this and other figures the several components of each relay are vertically aligned with each other, the movable one of each pair of contacts being shown as a segment (of a circle) which upon energization of the relay's coil (or other actuator) will be moved toward the latter.

If while power is available from the source S to the line L a battery be connected across the terminals T— or if while a battery is so connected the supply of power from source to line be initiated—fast-charge current will flow in the line and will result in the operation (i.e., closure) of contacts 43, in turn resulting in the shunting of the charge-sensing relay's input circuit 101 across the terminals T. (It is true that in the control system of FIGURE 1 the operation of contacts 43 serves to shunt the input circuit 101 across the serial combination of the terminals T and the resistor Q rather than across these terminals alone—but the inclusion of resistor Q in that which is shunted is of no consequence, as in parallel with that resistor are the normally closed contacts 112 which remain closed until after the completion of fast charge.) Either almost at once (in the case of a battery already charged) or after a period sufficient for the completion of fast charge (in other cases) the output contacts 105 of the charge-sensing relay will be operated.

Upon the operation of contacts 105 the circuit 120 is rendered operative to energize the control means 111, thereby to render operative (i.e., to open), the contacts 112 and thus to reduce the charge current. The circuit 120 will remain effective to energize the control means 111 only until the deoperation (i.e., opening) of the contacts 105, which will occur upon the rendering operative of contacts 112; when the circuit 120 ceases to energize the control means 111 the contacts 112 will still be operative (i.e., open), and the control means 111 then stands connected in effective series relationship to the line for energization by a component of the reduced charge current—it being this energization which maintains the contacts 112 operative. The reduced charge current will flow until either the cessation of power from source to line or the removal of the battery; with no more than nominal delay after the first-to-occur of those events the control system will be fully retsored to its normal quiescent condition. Upon any subsequent joint establishment of availability of power from the source and presence of a battery across the terminals, the flow of fast-charge current to the battery will be automatically reinitiated—and either promptly reduced or else continued until fast charge is completed (and then reduced), as the condition of the battery may require.

In FIGURE 2 there again appear the terminals T, the source S (which for example may comprise the transformer secondary U whose center-tap may form the negative terminal, and a pair of rectifiers X connecting the respective secondary extremities to a common point which forms the positive terminal, of the source), the two-conductor line L and the resistor R, these elements again collectively forming an elementary charger. In combination therewith FIGURE 2 illustrates a control system of the general type outlined in the preceding four paragraphs but embodying the present invention.

Thus in FIGURE 2 there will again be seen the charge-current-reducing switching device again in the form of normally closed contacts 112 shunting the current-reducing resistor Q serially present in the line; control means for the switching device 112 again in the form of coil 111 energizable to render and to maintain that device operative; the circuit 120 again serving as a means for energizing the control means 111 to render the switching device 112 operative; and the diode 125 through which again the control means 111 is energized by a component of the reduced charge current thereby to maintain the switching device 112 operative. In FIGURE 2, however, the simple charge-sensing relay 100 of FIGURE 1 is replaced by a considerable more elaborate charge-sensing relay system appropriate to the detection of completion of fast charge of the battery on the basis of the rate of rise of the battery voltage. Again in analogy to the circuit of FIGURE 1 there are provided means for rendering the charge-sensing relay system ineffective during the flow of reduced or no charge current in the line L, and as part of such means the current-sensing relay 40 may again be employed in FIGURE 2; with the particularly illustrated charge-sensing relay system, however, it is convenient to defeat, by a pair of normally open contacts 113 included in the relay 110 and connected in shunt to the contacts 43, the performance of the stated function by relay 40 during the flow of reduced charge current, and to perform that function instead within the charge-sensing relay system by means of a pair of normally closed contacts 14 included in the relay 110 and connected in a manner hereinafter described.

Figure 2:
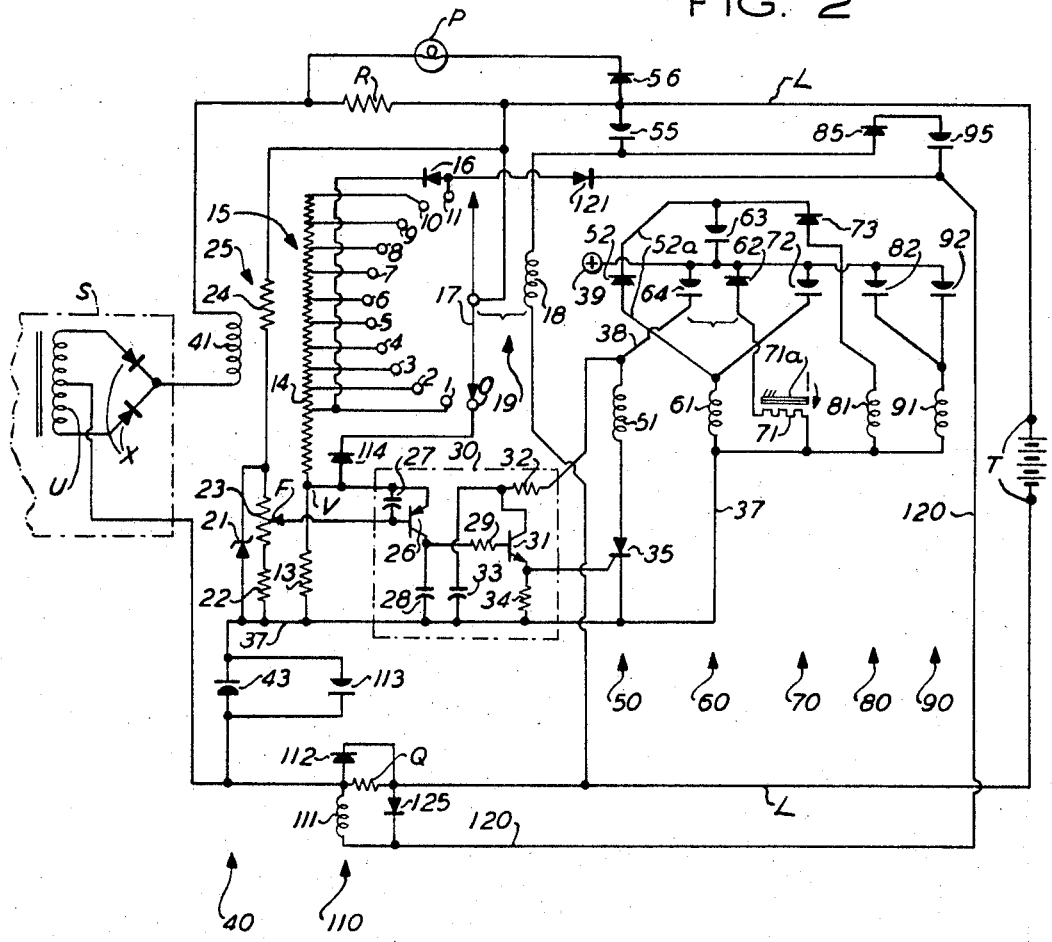
FIGURE 2 is a schematic circuit diagram of a generally similar charger but embodying a control system in accordance with the present invention.

The illustrated charge-sensing relay system comprises several elements, a first of which is a variable potentiometer system 15 which derives a voltage which is inter alia a function of battery voltage; it may be connected similarly to the input circuit 101 of the charge-sensing relay 100 of FIGURE 1 (i.e., in series with the contacts 43, the serial combination being connected across the serial combination of terminals T and resistor Q) and may be viewed as forming the input circuit of the charge-sensing relay system of FIGURE 2. This variable potentiometer system 15 of FIGURE 2 is shown as formed by a fixed lower resistor 13 whose lower extremity is connected to the upper one of the contacts 43 via the left-shown portion of a conductor 37, a tapped upper resistor 14 whose lower extremity is connected to the upper extremity of the resistor 13, and a multi (for example twelve) -position stepping switch 19 having a coil 18, a blade 17, a "home" contact O, ten successive nonhome contacts respectively numbered 1 through 10 which when contacted by the blade render effective respective values of the resistor 14. (The twelve contacts of the stepping switch are shown as comprised within a 180° span and the blade 17 as having two arms aligned with each other, one or the other of which (but not both) will be active at any one time; this is for convenience of illustration only, and in practice the twelve contacts may be distributed over a full 360° and a single-arm blade used.) The stepping switch may for example be of the variety which upon energization of its coil advances its blade through one half of an inter-contact step, and upon subsequent deenergization of that coil advances that blade through the remaining half of that step; it is accordingly particularly suited to pulsatory energizations of its coil.

For the case of a particular type of battery whose charging is hereinafter described by way of specific example, the values of resistor 13 and within resistor 14 may be so chosen that the potential (relative to that of conductor 37, contacts 43 or 113 being closed) of the junction between 13 and 14—hereinafter termed point V—will be just 3 volts under the following circumstances:

With blade 17 at contact and a battery voltage of
1 ---------------------------------------- 5.55
2 ---------------------------------------- 5.63
3 ---------------------------------------- 5.71
4 ---------------------------------------- 5.79
5 ---------------------------------------- 5.87
6 ---------------------------------------- 5.95
7 ---------------------------------------- 6.03
8 ---------------------------------------- 6.11
9 ---------------------------------------- 6.19
10 --------------------------------------- 6.27

A second of the elements of the charge-sensing relay system is a reference potentiometer system 25 connected in parallel with the variable potentiometer system 15 and itself comprising a fixed lower resistor 22, a fixed upper resistor 24, and a "trimmer" potentiometer 23 the entire small-valued resistance of which is serially interposed between 22 and 24. The reference potentiometer system 25 may also comprise the Zener diode 21, shunted across 22 and 23, which serves to stabilize the potential of the junction between 23 and 24 in the face of varying voltage across the line L and thus serves likewise to stabilize the potential at the adjustable contact—hereinafter termed point F—of the trimmer potentiometer 23. That adjustable contact may be so adjusted and the Zener diode 21 so chosen that the potential (relative to that of conductor 37, contacts 43 or 113 being closed) of point F will be just 3 volts.

A third of the elements of the charge-sensing relay system is a transistor amplifier 30 which when operative serves to compare the respective potentials of points V and F and to develop a finite output current when and only when the former is higher than the latter. The amplifier 30 may typically comprise a first-stage p-n-p transistor 26 and a second-stage n-p-n transistor 31, transistor 26 having its emitter connected to point V, its base connected to point F and its collector connected through a resistor 29 to the base of transistor 31; the emitter of transistor 31 is connected to conductor 37 through a loading resistor 34 and its collector is connected through a resistor 32 to a conductor 38 which, when the amplifier 30 is to be rendered operative, will be connected through means hereinafter described to a point 39 of potential positive with respect to conductor 37 under the condition of closure of either contacts 43 or 113 which will obtain while power is available from source S and a battery is present across the terminals T. To reduce the sensitivity of the amplifier to spurious transients there may be connected a capacitor 27 from emitter to base of transistor 26, a capacitor 28 from the collector of that transistor to the conductor 37, and a capacitor 33 from the collector of transistor 31 to that conductor.

A fourth of the elements of the charge-sensing relay system is the combination of an SCR 35 having its cathode connected to the conductor 37 and its cathode gate to the emitter of transistor 31, and a relay 50 whose coil 51 is connected between the anode of SCR 35 and conductor 38. The relay 50 comprises normally closed contacts 52, normally open contacts 55 and normally closed contacts 56, each of which will be operated to opposite-from-normal condition whenever the coil 51 is energized. Contacts 55 are serially connected in the circuit 120 adjacent to the upper conductor of the line L; the lower one of them is also connected to the upper extremity of the stepping-switch coil 18 (whose lower extremity is connected to the lower conductor of the line) so that any momentary closure of the contacts 55 will pulsatorily energize that coil. Since the output current of transistor 31 will flow principally through the gate-to-cathode path of SCR 35 it will be apparent that so long as the conductor 38 is connected to the abovementioned positive-potential point 39 not only will the amplifier 30 be rendered operative but also, whenever the potential of point V is higher than that of point F, the SCR 35 will be conductive and the relay coil 51 will be energized.

Figure 3:
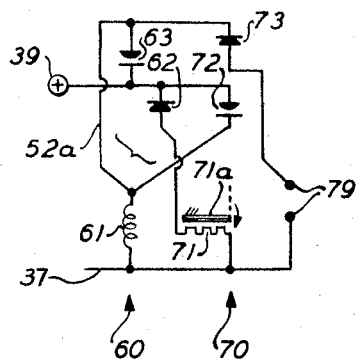
FIGURE 3 is a schematic circuit diagram of a thermomagnetic timer which forms a portion of the control system of FIGURE 2.

A fifth of the elements of the charge-sensing relay system is a thermo-magnetic timer of a type itself well known, comprising in combination a thermal relay and a magnetic relay and operating with a normal timing cycle which comprises a normal interval of cooling of a member in the thermal relay and may additionally comprise (to an extent depending on the initial thermal state of that member) a much shorter interval of heating (preceding the cooling interval) of that member. In its elementary form such a timer is shown in FIGURE 3. The thermal relay, which appears as 70, has an electrically energizable heater 71; a thermally responsive member 71a which is arranged to be heated by the heater 71 during periods of energization of 71 and to cool toward ambient temperature during periods of nonenergization, and which has a portion (e.g., its rightshown extremity) which is positionally responsive to the member's temperature; normally closed contacts 73 which are opened whenever the temperature of member 71a is appreciably above ambient; and normally open contacts 72 which are closed only when the temperature of that member at least equals a predetermined temperature substantially above ambient. The magnetic relay, which appears as 60, has a coil 61 and two pairs of contacts, i.e., normally closed contacts 62 and normally open contacts 63, each of which will be operated to opposite-from-normal condition whenever coil 61 is energized. A first extremity of each of heater 71 and coil 61 is connected to conductor 37; the second extremity of 71 is connected to point 39 through contacts 62, while the second extremity of coil 61 is connected to that point through two parallel paths one of which comprises the contacts 72 and the other of which serially comprises the contacts 63 and a path 52a.

The normal operation of the timer, in the case wherein member 71a is initially substantially at ambient temperature (so that the normal timing cycle will include an initial heating interval), and starting when a predetermined potential difference is first established between point 39 and conductor 37, is as follows: The heating interval is initiated and contacts 73 will very quickly be opened, but without immediate effect in view of the open condition of contacts 63. The subsequent closure of contacts 72 at the conclusion of the heating interval will energize coil 61, thereby opening contacts 62 to terminate the heating of 71a and to start its normal cooling interval; the conductive path 52a being present, that energization of 61 will also close contacts 63 to hold coil 61 energized in spite of the reopening of contacts 72 which will very soon occur. When member 71a has cooled back down substantially to ambient temperature—i.e., at the conclusion of the normal cooling interval and that of the normal timing cycle—contacts 73 will be reclosed. Both the contacts 63 and the contacts 73—which, taken together, form the output contacts of the timer—will then be closed, for the first time since the operation of the timer was initiated, and through them current will then be supplied to the output terminals 79. Thereafter coil 61 will remain energized, current will remain withheld from heater 71 (and member 71a will remain cool), the output contacts 63–73 will remain closed, and current will continue to be supplied to the output terminals 79 until the next removal of potential difference from between point 39 and conductor 37 or until the path 52a is next opened. The normal operation of the timer, if initiated when the member 71a is substantially above ambient temperature, is entirely similar excepting that the normal cooling interval will be preceded by a heating interval which will be progressively shorter the higher be that member 71a initial temperature; since the maximum heating interval is only about one-fourth as long as the normal cooling interval, the length of the normal timing cycle is reasonably independent of the initial temperature of member 71a.

As embodied in the charge-sensing relay system of FIGURE 2 (to whose point 39 and conductor 37 those of FIGURE 3 correspond) the timer of FIGURE 3, which for the purpose may have a normal cooling interval of 3 minutes, is elaborated by the inclusion in the path 52a of the normally closed contacts 52 mentioned above as forming part of the relay 50; it is further elaborated by the inclusion in the magnetic relay 60 of an additional pair of normally open contacts 64, and these are used as the means by which conductor 38 is connected to point 39. These elaborations preclude the normal operation of the timer so long as the point-V potential is greater than that of point F—because under that circumstance an energization of coil 61 and consequent closure of contacts 64 will entail energization of coil 51, which will open contacts 52 and thereby break path 52a to result in deenergization of coil 61 and opening of contacts 64 and a consequent deenergization of coil 51, whose energization is thus a pulsatory one only. Since the action just described will have reclosed contacts 62 a heating of the still-hot member 71a will be resumed, quickly again closing contacts 72 to reinitiate that action—and so on. The net effect is a so called "flashing" operation of the timer in which, after a single initial interval of heating of member 71a, contacts 72 will be recurrently closed and opened at a quite rapid rate (for example of the order of every second or so)— each closure and opening of 72 being accompanied by a pulsatory energization of coil 51. The "flashing" operation will continue either until the next removal of potential difference from between point 39 and conductor 37 or until the point-V potential becomes less than that of point F. (If the "flashing" operation of the timer be terminated in the latter manner the normal operation will be thereupon resumed, with an initial normal timing cycle consisting of the normal interval of cooling only.) Another effect of the elaborations is to preclude any energization of coil 51 during a heating interval—because for such an interval to occur contacts 62 must be closed, which demands a de-energized state of coil 61 and a consequent open condition of contacts 64.

So long as the point-V potential remains not greater than that of point F, normal operation of the timer is permitted. If either during or after a normal cooling interval in such operation (contacts 72 then being open and coil 61 energized and contacts 64 closed) the point-V potential becomes greater than that of point F, the resulting energization of coil 51 will entail some of the consequences described for that energization in the preceding paragraph: i.e., an opening of contacts 52 to result in deenergization of coil 61 and opening of contacts 64 and a consequent deenergization of coil 51, whose energization is thus again rendered a pulsatory one only, but not in this case a recurring one.

The charge-sensing relay system is completed by sixth and seventh elements, respectively formed by two relays 80 and 80; these have respective coils 81 and 91 of each of which a first extremity is connected to the conductor 37—the second extremity of coil 81 being connected in series with the contacts 73 (so that coil 81 stands in the position of output terminals 79 of FIGURE 3). Relay 80 comprises a pair of normally open contacts 82 and a pair of normally closed contacts 85; relay 90 comprises two pairs 92 and 95 each of normally open contacts. The second extremity of coil 91 is connected to the point 39 through the contacts 82 of relay 80 so as to be energized whenever coil 81 is energized—and also through its own contacts 92 (in parallel with 82) so that once energized it will be held energized, in spite of a subsequent deenergization of coil 81, until the next removal of potential difference from between point 39 and conductor 37. Contacts 85 and 95 are serially included in the circuit 120, between contacts 55 and coil 111 (but outside the portion of that circuit which would be traversed by current flow from contact 11 through diode 121). The serial combination of 55, 85 and 95 becomes a substitute for the contacts 105 of FIGURE 1; when all three of those contacts 55, 85 and 95 are simultaneously closed the circuit 120 will energize the control means 111 to render the charge-current-reducing switching device 112 operative.

From the general analogies of the control system of FIGURE 2 to that of FIGURE 1, initially brought out above, it will be appreciated that its operation is in a broad sense similar to that of the FIGURE 1 control system. The very substantial departure from the charge-sensing relay of FIGURE 1, however, entails substantial specific difference; in the following description of operation of the FIGURE 2 control system primary attention will be given to the areas of such differences.

That description will be presented in terms of a nickel-cadmium storage battery, as one in whose charging the present invention is highly advantageous; by way of example, in terms of a four-cell such battery; still more specifically, in terms of one with a 4-ampere-hour capacity rating. In that description reference will be made to FIGURE 4, which is a typical plot of voltage against time for an initially substantially discharged battery such as just referred to undergoing fast charge at a 4-ampere nominal rate. At the inception of operation of the charger on such a battery the latter may have a voltage of some 4.4 volts, but that will rise very rapidly during the first fraction of a minute of flow of fast-charge current. At the end of the initial interval (of about 1 minute) of heating of the timer's member 71a the battery voltage may for example have risen to about 5.6 volts. During that interval the stepping-switch blade 17 will have been at contact 0 and the point-V potential will have equalled the battery voltage and will have therefore been greater than the point-F potential of 3 volts; these conditions, which still obtain when the contacts 72 close at the end of that interval, are the conditions appropriate to a "flashing" operation of the timer such as above described, which will therefore be initiated at the end of that initial heating interval.

The first pulsatory energization of coil 51 and resulting momentary closure of contacts 55 will effect a pulsatory energization of stepping-switch coil 18, thereby effecting an advance of blade 17 from contact 0 to contact 1— the battery voltage meanwhile rising minutely to say 5.602 volts. With the blade at contact 1 the point-V potential is typically .5406 times battery voltage, thus being about 3.03 volts when the blade 17 first touches that contact; accordingly the "flashing" operation will not yet stop but will proceed to include another pulsatory energization of coils 51 and 18 which will advance blade 17 to contact 2. With the blade at contact 2 the potential at point-V may typically be .5330 times the battery voltage, which will typically have risen by another .002 volt (e.g., to 5.604); there will result a point-V potential of about 2.977 volts, which is less than the potential of point F. This is insufficient for continued "flashing" operation as such, and accordingly no rapid advancement of blade 17 from contact 2 will occur; instead there will be initiated a normal timing cycle of operation of the timer (on this occasion consisting of the normal 3-minute interval of cooling only, in view of the initially-heated condition of the member 71a).

It will typically take only about the first half-minute of this normal timing cycle for the battery voltage to rise to 5.63 volts and the point-V potential to 3 volts, and as soon as that rise has taken place the coils 51 and 18 will be pulsationaly energized resulting in the advance of the blade 17 to contact 3. That pulsatory energization, by reason of its momentary opening of contacts 52, will also result in the premature termination (i.e., interruption) of the normal timing cycle then under way and the initiation of a new normal timing cycle—which may be expected to be of about 3½ minutes duration, in view of the partially cooled state of member 71a at its inception.

With the blade at contact 3 a battery voltage of 5.71 volts, or .08 volt more than at contact 2, would be required for the point-V potential to reach the 3-volt point-F potential. Reference to the typical characteristics of FIGURE 4 will show that the .08 volt rise from 5.63 volts to 5.71 volts will take just about the 3½ minutes expectable duration of the normal timing cycle which was just initiated; is as accordingly possible either that voltage rise will be completed and coil 51 pulsatorily energized slightly before the conclusion of that cycle or, conversely, that the cycle will be concluded slightly before the completion of that voltage rise. In the former of those two alternative events the behavior of the system upon completion of the voltage rise will be quite analogous to that set forth in the preceding paragraph—excepting, of course that the blade 17 will advance from contact 3 to contact 4 and that the new normal timing cycle started coincidentally with that advance may be expected (in view of the at-least-substantially completed cooling of 71a) to be of about 4 minutes duration.

In the latter of the two alternative events mentioned in the preceding paragraph the conclusion of the timing cycle before completion of the voltage rise (and thus before the energization of coil 51) will result in the closure, for the first time in the operation of the charger on the connected battery, of the timer's output contacts—63 and 73, taken together. The immediate effect of that closure is confined to the relays 80 and 90; therein coil 81 will be energized, opening contacts 85 and closing contacts 82— the closure of 82 energizing coil 91 thereby not only closing contacts 95 but also closing contacts 92 which will thereafter hold coil 91 energized (and 95 closed) in spite of the next ensuing deenergization of coil 81 (which will occur promptly following the next start of operation of the timer). Upon the subsequent completion of the voltage rise coils 51 and 18 will be pulsatorily energized to advance the blade 17 from contact 3 to contact 4 and to initiate another normal timing cycle of about 4 minutes duration. It may be noted that at the time the momentary closure of contacts 55 occurs the contacts 85 will still be in open condition since coil 81 will not yet have been de-energized—with the result that the events occurring at the conclusion of this (or any other) uninterrupted normal timing cycle exclude any joint closure of contacts 55 and contacts 85, and thus (even though contacts 95 are closed) exclude also any rendering operative of the circuit 120.

With the blade at contact 4 a battery voltage of 5.79 volts would be required for the point-V potential to reach the 3-volt point-F potential. Reference to the typical characteristic of FIGURE 4 will show that the .08-volt rise from 5.71 to 5.79 volts will take something like 9 minutes, so that the normal timing cycle initiated at the time of advancement of the blade 17 to contact 4 is certain to be an uninterrupted one. This will be true in either of the two alternative events mentioned in the second preceding paragraph—the real difference between the behavior of the system in those two events being simply that the first uninterrupted normal cycle of operation of the timer will in the former event occur while blade 17 is at contact 4, whereas it will in the latter event have occurred while the blade was at contact 3. The significance of the first uninterrupted normal operation of the timer lies in the fact that at its conclusion contact 95—which prior to that time had been open and therefor had precluded any rendering operative of the circuit 120 and thus any reduction of the charge current—will become closed and will thereafter remain closed until a subsequent removal of the battery or interruption of the supply of power from source S. Thus after the conclusion of the first uninterrupted normal timing cycle—at whichever contact the blade 17 may have been when it occurred—the circuit 120 stands prepared to be rendered operative on the first occurrence of a joint closure of contacts 55 and contacts 85. (It may also be noted that after the conclusion of that cycle later closures of contacts 82 are wholly superfluous since coil 91 is then being maintained energized through its own then-closed contacts 92.)

After the conclusion of the uninterrupted normal timing cycle which was initiated when blade 17 advanced to contact 4, the blade will of course remain at that contact for the several further minutes required for the battery voltage to rise to 5.79 volts, at which time coils 51 and 18 will be pulsatorily energized, blade 17 will be advanced to contact 5 and another normal timing cycle will be initiated (after the conclusion of which the blade will still remain at contact 5 for the several further minutes required for the battery voltage to rise to 5.87 volts). Repetitive similar actions will take place, typically until the blade has been advanced to contact 8. The total times dwell of the blade at the successive contacts 4, 5, 6, and 7 may be about 9, 17½, 18½ and 6½ minutes respectively; obviously the average rates of rise of the battery voltage during those successive periods will be respectively about .0089, .0046, .0043 and .0133 volt minute—each less than the rate, of about .02 volt/minute, which would characterize a rise of .08 volt in a 4-minute normal timing cycle.

Figure 4:
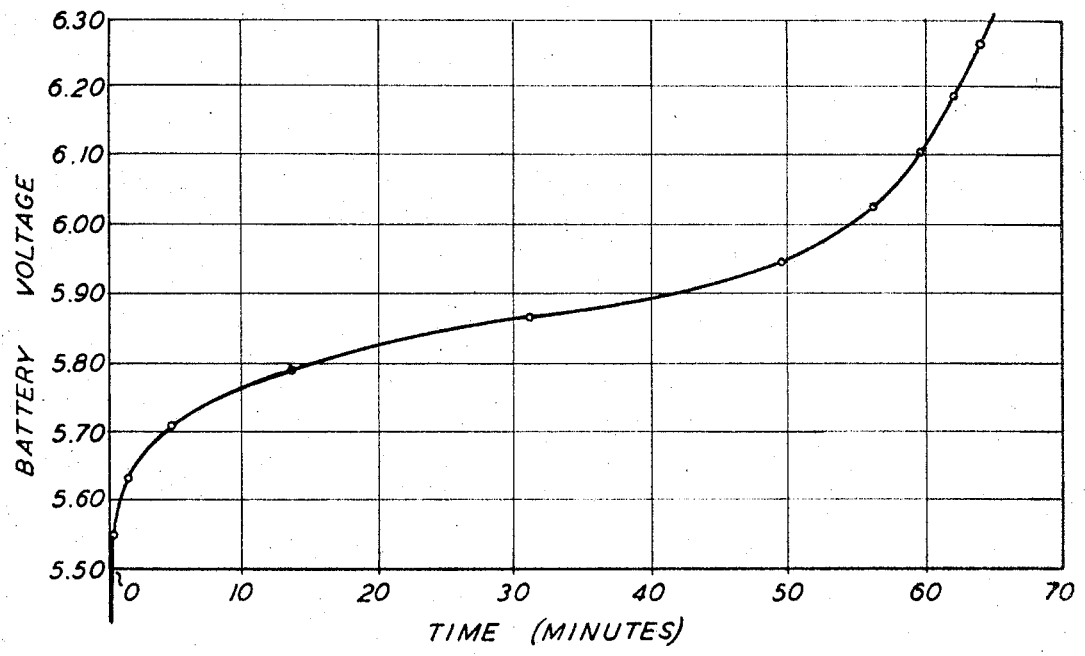
FIGURE 4 is a typical curve of battery voltage plotted against time, for an initially substantially discharged battery undergoing fast charge.

Reference to FIGURE 4 will show that after exceeding about 5.9 volts the typical characteristic voltage/time curve of the battery begins to be progressively steeper (which accounts for the shift from the .0043 rate to the .0133 rate above mentioned for the dwells at contacts 6 and 7 respectively). For the battery voltage to rise another .08 volt from a voltage of 6.03 volts (at which the shift of the blade to contact 8 will for example have occurred) to 6.11 volts will typically require only about 3½ minutes, i.e., it will occur with an average rate of rise of about .023 volt/minute, which is noticeably in excess of the .02 volt/minute mentioned at the end of the preceding paragraph. Accordingly with the blade 17 at contact 8 that voltage rise will be completed, and the coils 51 and 18 pulsatorly energized, before the conclusion of the normal timing cycle which was initiated when the blade reached that contact, and thus while coil 81 stands deenergized and contacts 85 stand closed. Contacts 95 having long previously been closed, the circuit 120 will be pulsatorily rendered operative to energize coil 111, thereby opening contacts 112 and reducing the charge current to the trickle or "topping"-charge rate established by the insertion of resistor Q in the line—energization of coil 111 being thereafter maintained by the flow of most of the reduced charge current through it via diode 125. In other words the charge-sensing relay system of FIGURE 2 will have detected the completion of fast charge by detecting that the rate of rise of battery voltage has exceeded the selected value of .02 volt/minute, and in response thereto will have caused the reduction of the charge current. (That reduction may advantageously be signalled in some convenient manner, as by the sustained substantial extinguishment (due to greatly reduced voltage across resistor R) of a pilot lamp P shunted across that resistor; as illustrated, that circuit of lamp P passes serially thru the above mentioned pair of normally closed contacts 56 included in relay 50, so that the pulsatory energizations of coil 51 will cause momentary extinguishments of that lamp, such extinguishments signalling the several advancements of the stepping-switch blade 17.)

Once the fast charge has been completed it is very desirable that the apparatus be promptly and reliably placed in condition for use in the charging of another battery. This requires that the blade 17 be automatically brought to its "home" contact 0, and this is arranged for basically within the charge-sensing relay system itself; it is because that system would be disconnected at contacts 43 by the deenergization of the current-sensing-relay coil 41 which attends the reduction of charge current that those contacts are shunted by the pair of normally open contacts 113 included in the relay 110, which will be closed upon and maintained closed after that reduction.

The further events at and following that pulsatory energization of coil 51 which invoked the reduction of charge current, including the blade—"homing" action, are as follows:

That energization will advance the blade 17 to the next contact (e.g., 9). In the absence of the charge-current reduction this would have further lowered the point-V potential, thereby precluding any early reenergization of coil 51. But upon the charge-current reduction there is impressed across the potentiometers 15 and 25 not merely the battery voltage but also the substantial drop in resistor Q or; in other words, the now substantially higher voltage of the source S. This in view of the Zener diode 21 has negligible effect on the point-F potential, but it does very substantially raise the point-V potential over what it otherwise would be, thereby insuring that it will be greater than that of point-F no matter to what contact (up to and including 11) the blade 17 advances. Thus there are re-established the conditions for the "flashing" operation of the timer described above, in which the coil 51 will be recurrently pulsatorily energized at a relatively rapid rate so as to effect a relatively rapid progressive advancement of the blade 17. When the blade reaches contact 11 those conditions still obtain, so that there will occur still another pulsatory energization of coil 51 which will advance the blade to its "home" position at contact 0; thereupon the previously opened contacts 114 will cause point V to assume a zero potential (relative to conductor 37), which is of course less than the point-F potential, thus terminating the condition for "flashing" operation and resulting in the blade 17 remaining at rest at that "home" position. Thereupon the coil 61 (which during the "flashing" operation was subjected to intermittent energization and de-energization) will stand sustainedly energized, holding open contacts 62 and thus permitting the cooling of member 71a, at the conclusion of which contacts 73 will be reclosed and coil 81 energized and contacts 85 opened; the apparatus will remain with contacts 85 open and contacts 95 closed (i.e., coils 81 and 91 both energized) until battery removal or cessation of power from the source S.

It is desirable to note that in the action of the stepping-switch above described the absolute position of the blade 17 (i.e., which contact it touches at any given time) is not of primary significance; what is of primary significance is the rate of rise of the battery voltage occurring after the time of arrival of the blade at any position. When with the blade at any contact that rate exceeds the selected value (e.g., .02 volt/minute) then the circuit 120 is rendered operative and the charge current reduced and the blade 17 rapidly advanced to its home position—provided that with the blade at some previously reached contact the rate of rise of the battery voltage had been less than that selected value. It is that proviso, enforced by the contacts 95, which precludes the rendering operative of the circuit 120 and the reduction of the charge current in response to the rapid rise of battery voltage seen above to occur in the early stage of charging of the battery.

It is of course entirely possible that there will be connected to the terminals T a battery which is already partially charged or even one fully charged. If the state of charge of such a battery be sufficiently less than full so that its voltage-time characteristic at any intermediate time region has a slope less than the selected value (e.g., less than .02 volt/minute), then the action of the charger in charging that battery will be qualitatively similar to that above described; the initial relatively rapid advancement of the stepping-switch blade 17 from contact 0 may proceed further, but at some one or more of its contacts it will dwell for more than 4 minutes, contacts 95 being closed on the first such occasion.

If on the other hand that state of charge be full, or near enough to full so that at no time does the voltage-time characteristic have a slope less than the selected value, then at no position of the blade 17 will there occur any closure of contacts 95. When the blade has reached contact 11, however, it will connect the upper one of the line-L conductors to the circuit 120 via diode 121, thereby rendering that circuit operative to reduce the charge current independently of the conditions of the contacts 55, 85 and 95. In this extreme case, the reduction of charge current will occur in response to ultimate voltage of the battery rather than in response to the rate of rise of battery voltage. This ultimate-voltage cut-off of fast-charge current, which is a superimposed safety factor, may of course be caused to occur at any ultimate voltage; with the purely typical values above disclosed it will occur at minutely over 6.27 volts, that being the battery voltage which with the blade at contact 10 still maintains the point-V potential slightly greater than the reference potential, thus permitting the advance of the blade to contact 11 (from which it will of course proceed to its "home" position at contact 0, since the drop in diode 16 is not greater than that in the portion of resistor 14 intervening between contact 10 and contact 1).

Another possibility likely to be occasionally encountered is that of an interruption, typically a short one, of the supply of power from source S during the process of charging of a battery; while such an interruption persists the stepping-switch coil 18, although the still-present battery voltage stands applied across the serial combination of it and contacts 55, cannot be energized because the circuit of coil 55 will be open at 43 and 113 and the blade 17 will therefore remain at the position where it was when the interruption began. During interruption the battery voltage will drop, at first precipitously and the progressively more gradually, toward a value which will be less than say 5.55 volts to a degree inversely dependent on the state of charge at which the battery had arrived when the interruption began. If the blade still be at contact 0 (as a result of interruption during the very initial heating of member 71a) the behavior of the apparatus on resumption of power will be substantially the full normal operation above described. If the blade at the beginning (and hence at the ending) of the interruption be at one of the intermediate contacts of the stepping-switch, then on resumption of power and reclosure of contacts 43 the battery voltage must rise, in order again to energize coil 51, to the same value as that to which it would have had to rise if there had been no interruption. Subject to potential exceptions next to be noted, this insures that the overall charging process will not be significantly affected by the interruption.

A first exception applies in the case wherein the point-39 potential (relative to that of the lower conductor of the line L) is supplied from a source not subject to the same interruption, in which case the operation of the timer will not have been interrupted; in connection with an interruption early in the charging process the possibility then arises that during the interruption a normal timing cycle will be completed and coil 91 placed is energized condition and contacts 95 placed in closed condition, so that upon a resumed relatively steep rise of the voltage of the still-little-charged battery the circuit 120 may be prematurely rendered operative to terminate the fast charge. As second exception (but not the first) applies in the case wherein the point-39 potential is supplied from a source subject to the same interruption (for example from the upper conductor of the line L, typically immediately adjacent the source S), in which case the interruption will annul any previously effected closure of contacts 95; in connection with an interruption quite late in the charging process the possibility then arises that contacts 95 will not again be closed. The first of these exceptions could result in failure of the battery to be appreciably charged; the second could result in failure to effect termination of fast charge on a rate-of-rise basis—but termination would still be affected on an ultimate voltage basis in a manner broadly analogous to that above described in connection with a possible attempt to charge an already-fully-charged battery, and for this reason I prefer the latter manner of supply of the point-39 potential.

There is of course intended no limitation to the particular numerical examples given in the foregoing description, which will require substantial variation as between different types of storage batteries and numbers of their cells and may be materially varied even for the particular case of a 4-cell nickel-cadmium battery. By way of example of such variations there has been satisfactorily employed, in the 4-cell nickel-cadmium case, a predetermined rate of rise of about .012 (rather than .02) volt/minute, together with a predetermined ultimate magnitude of battery of about 6.15 (rather than 6.27) volts—such values representing somewhat more conservative choices.

The sensing of rate of battery-voltage rise effected in the manner above disclosed may be viewed as a sensing of the magnitudes of battery-voltage rise during the successive time intervals (each of substantially 4 minutes length) established by the thermomagnetic timer, e.g., a sensing of the magnitude of each rise to determine whether it is below or above .08 volt. Alternatively it may be viewed as a sensing of the times elapsed during successive (specifically, consecutive) battery-voltage rises of substantially uniform (e.g., .08-volt) magnitude, e.g., a sensing of each elapsed time to determine whether it is above or below about 4 minutes.

In the apparatus specifically disclosed in FIGURE 2 the performance of the funtcion of rendering the charge-sensing relay system ineffective during the flow of reduced or no charge current is distributed between the relay 110 where contacts 114 perform it during reduced-current flow, and the relay 40 whose contacts 43 perform it during no curernt flow—the charge from FIGURE 1 (in which the relay 40 performs the function under both those conditions) being made in order to continue the connection of conductor 37 to the lower conductor of the line L during reduced-current flow. Note is made that if the relay 40 be designed so that its contacts 43 will be closed during the flow either of fast-charge current or of the reduced current, then the contacts 113 may be omitted from the relay 110.

While I have illustrated and described my invention in terms of a particular example and a particular embodiment thereof, I intend thereby no unnecessary limitations. Modifications in many respects will be suggested by my disclosure to those skilled in the art, and such modification will not necessarily constitute departures from the spirit of the invention or from the scope, which I undertake to define in the following claims.

I claim:

1. The method of control of the charging of a battery which comprises (1) sensing the rate of rise of voltage of the battery while fast-charging the battery, and (2) terminating that fast-charging upon a sensing of a rate of rise of the voltage of the battery exceeding a predetermined rate of rise.

2. The subject matter claimed in claim 1 wherein the sensing referred to in step (2) is a sensing of a rate of rise of voltage of the battery exceeding said predetermined rate subsequent to a sensing of a rate of rise of the battery voltage less than said predetermined rate of rise.

3. The subject matter claimed in claim 2 further including, in the absence of any sensing of a rate of battery-voltage rise less than said predetermined rate of rise, the step of (3) terminating the fast-charging of the battery upon the attainment by the battery voltage of a predetermined ultimate magnitude.

4. The subject matter claimed in claim 1 wherein step (1) comprises sensing the magnitude of battery-voltage rise respectively effected during successive time intervals, each of said intervals being substantially of a uniform predetermined length, while fast-charging the battery.

5. The subject matter claimed in claim 4 wherein step (2) comprises terminating the fast-charging of the battery upon a sensing of a magnitude of battery-voltage rise effected during one of said intervals exceeding a predetermined magnitude of rise.

6. The subject matter claimed in claim 5 wherein the sensing referred to in step (2) is a sensing of a magnitude of battery-voltage rise effected during one of said intervals exceeding a predetermined magnitude of rise, subsequent to a sensing of a magnitude of battery-voltage rise effected during an earlier one of said intervals less than said predetermined magnitude of rise.

7. The subject matter claimed in claim 6 further including, in the absence of sensing of a magnitude of battery-voltage rise effected during any of said intervals less than said predetermined magnitude of rise, the step of (3) terminating the fast-charging of the battery upon the attainment by the battery voltage of a predetermined ultimate magnitude.

8. The subject matter claimed in claim 1 wherein step (1) comprises sensing the lengths of time respectively expended during successive rises of voltage of the battery, each of said rises being substantially of a uniform predetermined magnitude, while fast-charging the battery.

9. The subject matter claimed in claim 8 wherein said successive rises are consecutive rises.

10. The subject matter claimed in claim 8 wherein step (2) comprises terminating the fast-charging of the battery upon a sensing of a length of time expended during one of said rises less than a predetermined length of time.

11. The subject matter claimed in claim 10 wherein the sensing referred to in step (2) is a sensing of a length of time expended during one of said rises less than a predetermined length of time, subsequent to a sensing of a length of time expended during an earlier one of said rises greater than said predetermined length of time.

12. The subject matter claimed in claim 11 further including, in the absence of sensing of a length of time expended during any of said rises greater than said predetermined length of time, the step of (3) terminating the fast-charging of the battery upon the attainment by the battery voltage of a predetermined ultimate magnitude.

13. In a battery charger which includes means providing for fast-charging of the battery, the combination of means for sensing the rate of rise of voltage of the battery during the fast-charging thereof, and means connected with said sensing means for terminating said fast-charging in response to a sensing of a rate of rise of the voltage of the battery exceeding a predetermined rate of rise.

14. The subject matter claimed in claim 13 further including means operatively connected with said sensing means and with said terminating means, for suspending said response of said terminating means until after said sensing means has during said fast-charging first sensed a rate of rise of the battery voltage less than said predetermined rate of rise.

15. The subject matter claimed in claim 14 further including means, operatively connected with said terminating means and effective without regard to said suspending means, for causing the operation of said terminating means in response to the attainment by the battery voltage of a predetermined ultimate magnitude.

16. The subject matter claimed in claim 13 wherein said rate-of-rise sensing means comprises means for establishing successive time intervals each substantially of a uniform predetermined length, and means for sensing the magnitudes of battery-voltage rise respectively effected during the several said intervals.

17. The subject matter claimed in claim 16 wherein said terminating means is rendered operative in response to a sensing by said sensing means of a magnitude of battery-voltage rise effected during one of said intervals exceeding a predetermined magitude of rise.

18. The subject matter claimed in claim 17 further including means, operatively connected with said sensing means and with said terminating means, for suspending the response of said terminating means until after said sensing means has during said fast-charging first sensed a magnitude of battery-voltage rise effected during one of said intervals less than said predetermined magnitude of rise.

19. The subject matter claimed in claim 18 further including means, operatively connected with said terminating means and effective without regard to said suspending means, for causing the operation of said terminating means in response to the attainment by the battery voltage of a predetermined ultimate magnitude.

20. The subject matter claimed in claim 13 wherein said rate-of-rise sensing means comprises means for sensing the lengths of time respectively expended during successive rises of the battery voltage, each of said rises being substantially of a uniform predetermined magnitude.

21. The subject matter claimed in claim 20 wherein said successive rises are consecutive rises.

22. The subject matter claimed in claim 20 wherein said terminating means is rendered operative in response to a sensing by said sensing means of a length of time expended during one of said rises less than a predetermined length of time.

23. The subject matter claimed in claim 22 further including means, operatively connected with said sensing means and with said terminating means, for suspending said response of said terminating means until after said sensing means has during said fast-charging first sensed a length of time expended during one of said rises greater than said predetermined length of time.

24. The subject matter claimed in claim 23 further including means, operatively connected with said terminating means and effective without regard to said suspending means, for causing the operation of said terminating means in response to the attainment by the battery voltage of a predetermined ultimate magnitude.

25. In a battery charger the combination, with a pair of terminals across which a battery may be connected and a two-conductor line through which fast-charge current may flow from a source to a battery present across said terminals, of a charge-sensing relay system having an input circuit connected with said line and having output switching means operated in response to a rate of rise of voltage of a battery present across said terminal exceeding a predetermined rate; a charge-current-reducing switching device connected with said line; control means for said switching device; means controlled by, and rendered operative in response to a state of operation of, said output switching means for energizing said control means to render said switching device operative, said control means when said switching device is and said energizing means is not operative being connected in effective series relationship to said line for energization by a component of the reduced charge current thereby to maintain said switching device operative; and means rendering said charge-sensing relay system ineffective during the flow of reduced or no charge current in said line.

References Cited

UNITED STATES PATENTS

| 2,901,609 | 8/1959 | Campbell | 328—127 |
| 3,071,713 | 1/1963 | Duncan | 340—233 X |
| 3,242,411 | 3/1966 | Lilienfeld | 320—40 X |
| 3,312,889 | 4/1967 | Gold | 320—40 X |

JOHN F. COUCH, Primary Examiner.

STANLEY WEINBERG, Assistant Examiner.

U.S. Cl. X.R.

320—23, 30; 323—22; 317—148.5; 307—252